(12) United States Patent
Bay

(10) Patent No.: US 7,063,357 B1
(45) Date of Patent: Jun. 20, 2006

(54) FLEXIBLE PIPE COUPLING

(75) Inventor: Andrew Thomas Bay, Grant, MI (US)

(73) Assignee: EBW, Inc., Muskegon, MI (US)

( * ) Notice: Subject to any disclaimer, the term of this patent is extended or adjusted under 35 U.S.C. 154(b) by 0 days.

(21) Appl. No.: 10/306,372

(22) Filed: Nov. 27, 2002

Related U.S. Application Data

(60) Provisional application No. 60/334,452, filed on Nov. 30, 2001.

(51) Int. Cl.
*F16L 33/00* (2006.01)

(52) U.S. Cl. ............... 285/246; 285/353; 285/276; 285/258

(58) Field of Classification Search ........... 285/353, 285/384, 246, 241, 256, 276, 280, 258
See application file for complete search history.

(56) References Cited

U.S. PATENT DOCUMENTS

| | | | | |
|---|---|---|---|---|
| 743,401 A | 11/1903 | Sherman | | |
| 1,753,005 A | 4/1930 | Grady | | |
| 2,146,756 A | 2/1939 | Miller | ......... | 285/84 |
| 2,228,018 A | 1/1941 | Scholtes | ......... | 285/84 |
| 2,262,171 A | 11/1941 | Downes | ......... | 29/88.2 |
| 2,273,397 A * | 2/1942 | Couty | ......... | 285/256 |
| 2,427,685 A | 9/1947 | Midtlyng et al. | ......... | 29/148.2 |
| 2,430,921 A * | 11/1947 | Edelmann | ......... | 285/256 |
| 2,450,581 A * | 10/1948 | Couty | ......... | 285/280 |
| 2,570,477 A * | 10/1951 | Paquin | ......... | 285/256 |
| 2,623,837 A | 12/1952 | Butler | ......... | 154/83 |
| 2,634,786 A | 4/1953 | Stinchcomb et al. | ......... | 153/1 |
| 2,736,473 A | 2/1956 | Diget et al. | ......... | 153/1 |
| 2,766,804 A | 10/1956 | Kaiser | ......... | 153/1 |
| 3,534,988 A | 10/1970 | Lindsay | ......... | 285/305 |
| 3,575,447 A | 4/1971 | Merkle | ......... | 285/248 |
| 4,083,584 A | 4/1978 | Buzzi | ......... | 285/258 |
| 4,775,073 A | 10/1988 | Webb | ......... | 220/256 |
| 4,817,996 A * | 4/1989 | Fouts | ......... | 285/276 |
| 4,863,202 A * | 9/1989 | Oldford | ......... | 285/353 |
| 4,893,848 A | 1/1990 | Melcher | ......... | 285/258 |
| 5,031,301 A | 7/1991 | Oetiker | ......... | 29/507 |
| 5,096,234 A | 3/1992 | Oetiker | ......... | 285/256 |
| 5,127,157 A | 7/1992 | Oetiker | ......... | 29/890.144 |
| 5,190,323 A | 3/1993 | Oetiker | ......... | 285/39 |
| 5,207,460 A | 5/1993 | Oetiker | ......... | 285/258 |
| 5,263,794 A | 11/1993 | Webb | ......... | 405/52 |
| 5,271,518 A | 12/1993 | Webb | ......... | 220/320 |
| 5,295,718 A | 3/1994 | Bartholomew | ......... | 285/258 |
| 5,297,896 A | 3/1994 | Webb | ......... | 405/52 |
| 5,346,625 A | 9/1994 | Webb | ......... | 210/691 |

(Continued)

FOREIGN PATENT DOCUMENTS

JP     5272673     * 10/1993     .......... 285/256

*Primary Examiner*—David Bochna
(74) *Attorney, Agent, or Firm*—Young & Basile, P.C.

(57) ABSTRACT

A flexible pipe coupling having first and second member rotatable relative to one another. The first member defines national pipe taper, or NPT, threads and the second member includes an internal swag member for forming a swagged connection with a flexible pipe. The coupling can be swagged fitted with respect to an end of a fluid transfer pipe having an inner or primary hose and an outer or secondary hose. The swaged connection can be made with the primary hose. The outside diameter of the coupling can be substantially the same as the outside diameter of the secondary hose so that the coupling can be passed through an entry boot of a sump disposed under a fuel dispenser.

19 Claims, 6 Drawing Sheets

U.S. PATENT DOCUMENTS

| | | | |
|---|---|---|---|
| 5,366,318 A | 11/1994 | Brancher | 405/36 |
| 5,398,976 A | 3/1995 | Webb | 285/93 |
| 5,405,174 A | 4/1995 | Sonden et al. | 285/183 |
| 5,605,359 A | 2/1997 | Hoff | 285/92 |
| 5,713,607 A | 2/1998 | Webb | 285/133.1 |
| 5,722,699 A | 3/1998 | Brancher | 285/142.1 |
| 5,746,454 A | 5/1998 | Webb | 285/92 |
| 5,794,982 A | 8/1998 | Green et al. | 285/55 |
| 5,829,795 A | 11/1998 | Riesselmann | 285/256 |
| 5,831,149 A | 11/1998 | Webb | 73/40.5 |
| 5,911,155 A | 6/1999 | Webb | 73/40.5 |
| 5,927,762 A | 7/1999 | Webb | 285/123.15 |
| 5,975,132 A | 11/1999 | Gleeson | 137/571 |
| 5,984,377 A | 11/1999 | Struthers et al. | 285/258 |
| 6,029,505 A | 2/2000 | Webb | 73/40.5 R |
| 6,059,208 A | 5/2000 | Struthers | 241/46.01 |
| 6,186,559 B1 | 2/2001 | Fisher et al. | 285/256 |
| 6,193,282 B1 | 2/2001 | Assenheimer | 285/115 |
| 6,217,082 B1 | 4/2001 | Orcutt et al. | 285/272 |
| 6,217,083 B1 | 4/2001 | Bravo | 285/276 |
| 6,270,126 B1 | 8/2001 | Juedes | 285/246 |
| 6,447,017 B1 * | 9/2002 | Gilbreath et al. | 285/280 |
| 6,485,064 B1 * | 11/2002 | Davidson | 285/256 |
| 6,491,325 B1 * | 12/2002 | Boche | 285/256 |
| 6,494,233 B1 * | 12/2002 | Seghi | 285/256 |
| 6,554,320 B1 * | 4/2003 | Cresswell | 285/256 |
| 6,619,699 B1 * | 9/2003 | Brumfield | 285/256 |

* cited by examiner

FLEXIBLE PIPE COUPLING

CROSS-REFERENCE TO RELATED APPLICATIONS

This application claims the benefit of the provisional patent application 60/334,452 for a FLEXIBLE PIPE COUPLING, filed on Nov. 30, 2001. This claim is made under 35 U.S.C. §119(e) and 37 C.F.R. 1.53(c)(3).

BACKGROUND OF THE INVENTION

In a typical service station there are dispensers which have sumps below them to contain any leakage, should it occur. All of the connections from the supply tank and pump are made in the dispenser sump. Typically, when a flexible pipe is utilized there is some type of transition coupling which converts a non-standard coupling into some type of industrial standard connection to the emergency shear valve located at the base of the dispenser (FIGS. 1 and 2). In order to provide a leak free connection, the prior art utilizes an internally swaged swivel connection. The prior art design also allows for the coupling to be installed (swaged) onto the flexible pipe before the pipe is inserted into the dispenser sump. However, there was still a question of how to connect to a standard National Pipe Taper NPT connection for the emergency shear valve. In the prior art, the transition to a standard NPT connection for the emergency shear valve was made by offering yet another fitting which bridges the swaged swivel fitting to a standard NPT threaded connection.

SUMMARY OF THE INVENTION

It is advantageous in the flexible pipe industry to provide a single pipe/coupling assembly which is internally swaged, has a swiveling connector, the swiveling connector has a standard NPT thread at one end, and the entire assembly is easily installed into a sump passing through an entry boot.

The advantage of such a product is that the customer saves money because an additional fitting is not required. In addition, this product will reduce the number of connections inside the dispenser sump. Since the number of connections is reduced, the number of leak paths is reduced giving the customer improved performance and confidence at lower cost. The capability of producing such a coupling is not feasible using existing design approaches. It is the intent of the invention to address the aforementioned concerns and advantages.

The invention provides a flexible pipe coupling including a first member having an aperture extending between first and second ends of the first member and an outer surface defining national pipe taper threads. The coupling also includes a second member having an internal swag member. The second member is engaged with the first member such that the second member can rotate with respect to the first member.

At least a portion of the second member can be freely insertable in the aperture of the first member. Alternatively, a portion of the second member can be compressed when inserted in the aperture of the first member and form a snap fit when passed through the aperture. The portion of the second member can extend the length of the aperture, less than the length of the aperture, or greater than the length of the aperture.

The aperture can define one more shoulders between the first and second ends. The portion of the second member can engage one or more of the shoulders defined by the aperture when the portion is inserted in the aperture. The portion of the second member, alone or in cooperation with the first member, can define a substantially cylindrical fluid pathway between the first end and the second end.

The invention can also include means for limiting axial movement of the first member and the second member relative to one another in at least one direction. For example, the invention can include structure to limit movement of the members toward one another, movement of the members away from one another, or both. Movement limiting means can include an annular projection defined by an outer surface of the second member. The annular projection can be freely insertable with respect to at least a portion of the aperture of the first member. In addition, or alternatively, limiting means can include an annular groove defined by one of the inner surface of the first member and an outer surface of the second member. In addition, or alternatively, limiting means can include a snap ring.

The invention can also include at least one groove defined by one of the inner surface of the first member and an outer surface of the second member. The at least one groove can be disposed between first limiting means and second limiting means. An o-ring can be positionable in the at least one groove.

The invention can also include a flexible pipe including a primary hose and a secondary hose. The primary hose can extend internal with respect to the secondary hose and can be swagged to the second member. The invention can also include a sump defining at least one opening and an entry boot positionable with respect to the at least one opening. The entry boot can include an aperture for receiving the first and second members so that the first and second members are positionable in the sump. The entry boot can sealing engage the secondary hose. An outside diameter of the secondary hose can be substantially the same as an outside diameter of the outer surface defining the national pipe taper threads.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE ILLUSTRATED EMBODIMENT

Figure 1:
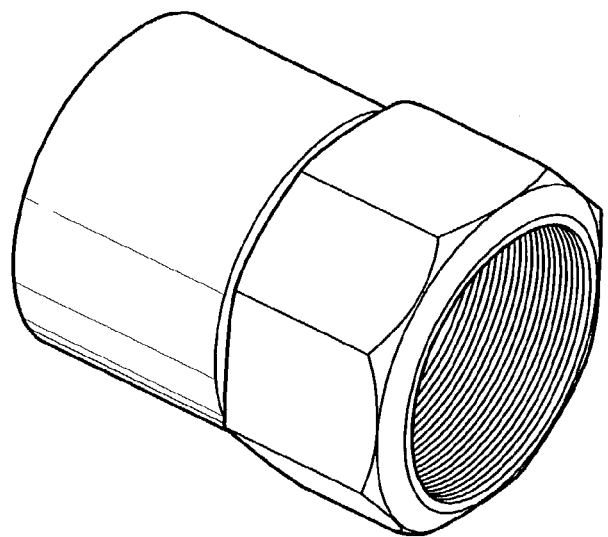
FIG. 1 is a perspective view of a fitting according to the prior art.
Figure 2:
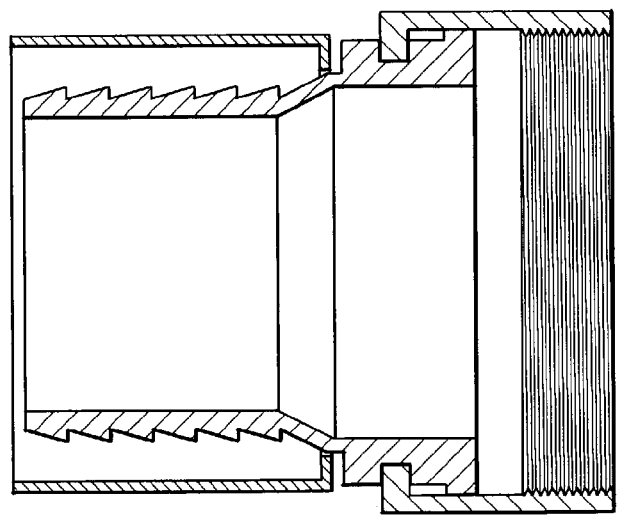
FIG. 2 is a cross-sectional view of the fitting according to the prior art.
Figure 3:
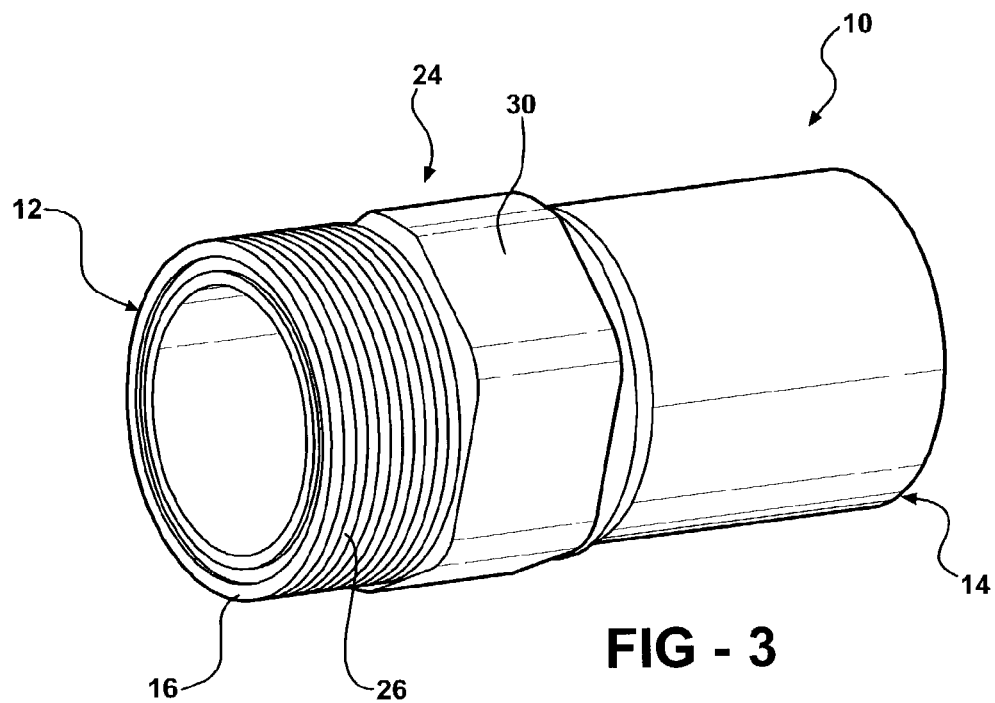
FIG. 3 is a perspective view of a first embodiment of the flexible pipe coupling according to the present invention.
Figure 4:
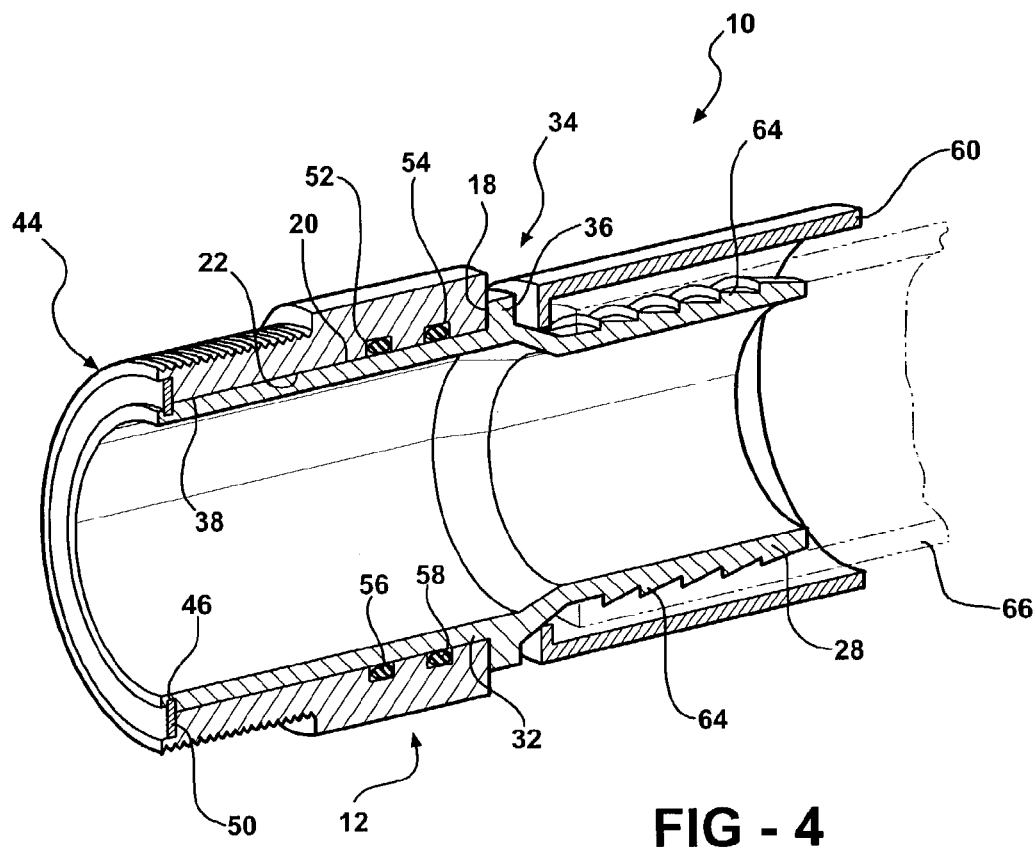
FIG. 4 is a cross-sectional view of the first embodiment of the flexible pipe coupling shown in FIG. 3.
Figure 5:
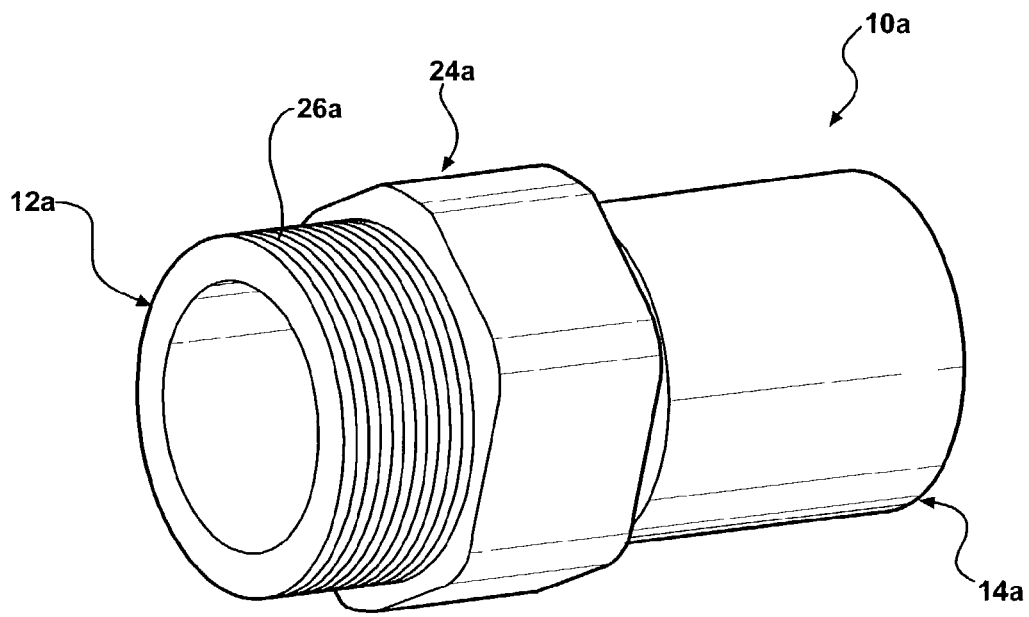
FIG. 5 is a perspective view of a second embodiment of the flexible pipe coupling according to the present invention.
Figure 6:
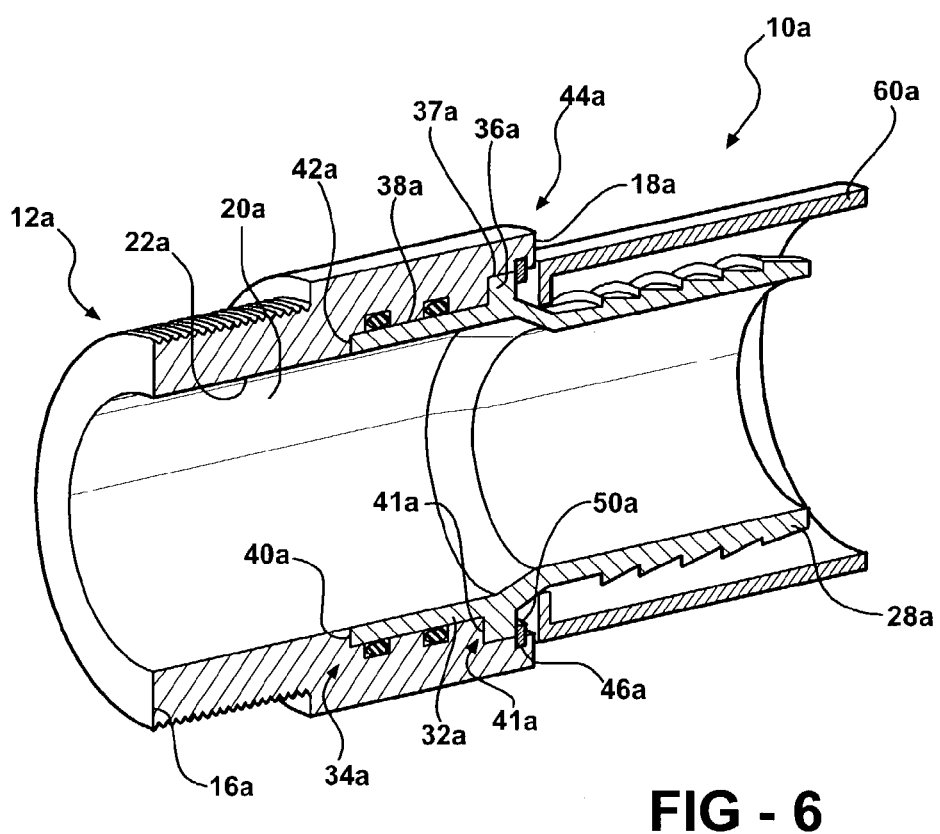
FIG. 6 is a cross-sectional view of the second embodiment of the flexible pipe coupling shown in FIG. 5.

FIGS. 3 and 5 show 1.5 inch and 2.0 inch pipe coupling assemblies respectively according to the present invention. FIGS. 4 and 6 show their sections respectively. Other sizes would be available having the same design characteristics as shown in FIGS. 3–8.

The swivel coupling or flexible pipe coupling 10 of each embodiment has a nipple or first member 12 with a main portion or outer surface 24 with an external surface 30 shaped to cooperate with a wrench. The main portion 24 is integral with a threaded connecting portion or threads 26. The nipple 12 has an interior surface 22. At least a portion of the interior surface 22 is adapted for receiving a sleeve device or second member 14. The sleeve device 14 has one end portion 32 configured to be received within portion of the nipple 12 so that the nipple 12 can rotate relative to the sleeve device 14. The other end of the sleeve device 14 is configured with a sleeve or internal swag member 28 for receiving an end of a flexible pipe (shown in phantom at 66 in FIG. 4). The device 14 is formed of an outer circumferential wall 60 and the sleeve 28. Wall 60 and sleeve 28 are spaced from each other for receiving the flexible pipe. The outer surface of inner wall of sleeve 28 has teeth 64 formed thereon for gripping into the flexible pipe. To increase the holding ability of the flexible pipe connection, the space between the wall 60 and sleeve 28 which holds the end of the flexible pipe is reduced in its diametric dimensions by means of a conventional swaging tool (not shown). The conventional tool is forced through the diameter of the sleeve 28 to expand the sleeve 28 and grip the teeth 64 into the flexible pipe. The portion of the sleeve device 14 may also be referred to as the swaged section since only this portion of the coupling 10 is affected by the swaging tool.

Both the 1.5 inch and 2.0 inch coupling assemblies utilize a snap ring 50 or 50a to hold the nipple 12 and sleeve device 14 together so that the nipple 12 can rotate relative to the sleeve device 14. In one embodiment, i.e. the 1.5 inch coupling in FIGS. 3 and 4, the snap ring 50 is secured in the front part of the coupling assembly near the threads 26. In the other embodiment, i.e. the 2.0 inch coupling in FIGS. 5 and 6, the snap ring 50a is secured in the rear part of the coupling assembly 10 near the swaged section. The snap rings 50, 50a are installed within grooves 46, 46a in the nipple 12. Both embodiments have two internal O-rings 56, 58 in grooves 52, 54 in the nipple 12 for redundant sealing capability. Both embodiments are swaged onto the pipe by axially extracting a conventional tapered mandrel through the swaged section (shown in FIGS. 4 and 6). The mandrel forces the sleeve 28 to expand and compress the installed pipe against the outer wall 60.

Various embodiments of the invention are shown throughout the figures. The figures include common elements in different structural configurations. Common elements are designated with a common base numeral and differentiated with an alphabetic designation.

Figure 7:
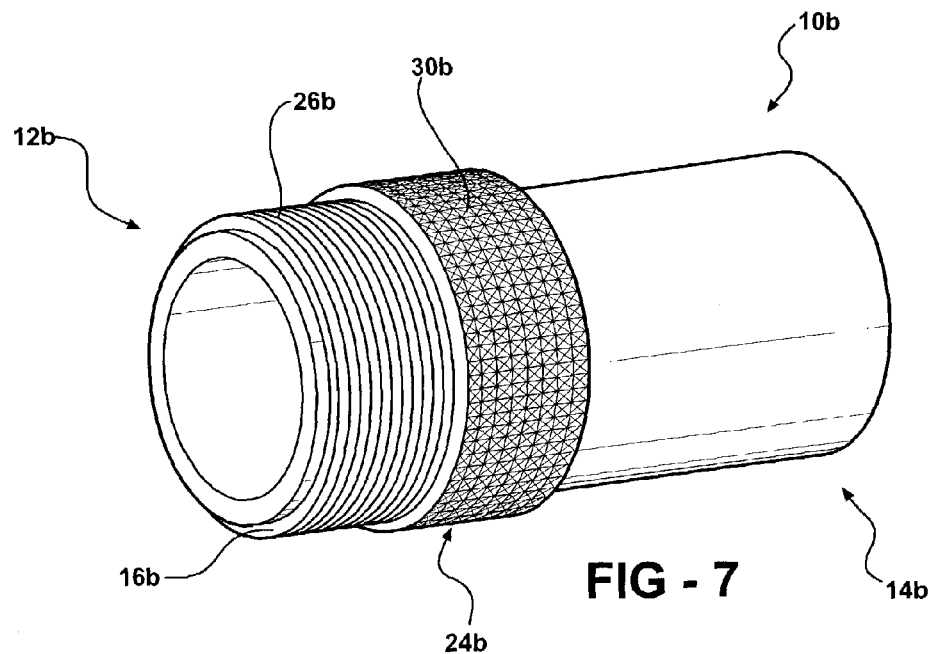
FIG. 7 is a perspective view of a third embodiment of the flexible pipe coupling according to the present invention.
Figure 8:
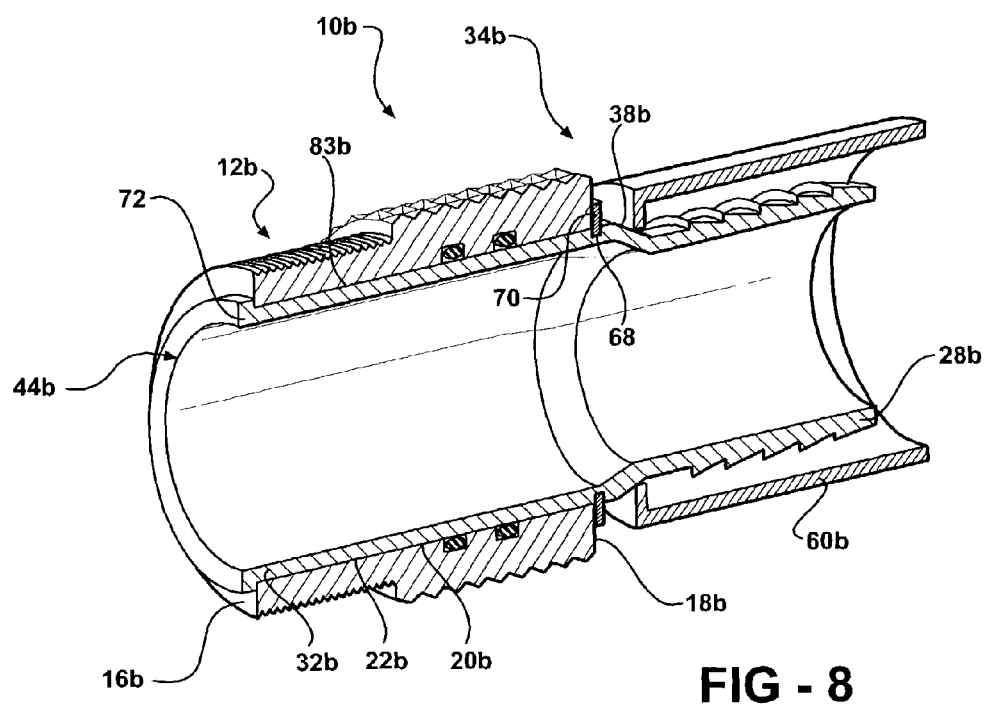
FIG. 8 is a cross-sectional view of the third embodiment of the flexible pipe coupling shown in FIG. 7.

Referring now to FIGS. 3 and 4, a flexible pipe coupling 10 for communicating fluid includes a first member 12 and a second member 14. The first member 12 includes a first end 16, a second end 18, an inner surface 20 defining an interior surface or aperture 22 extending between the first end 16 and the second end 18, and an outer surface 24 defining national pipe taper, or NPT, threads 26. FIGS. 5–8 show that alternative embodiments 10a, 10b of the flexible pipe coupling can be similar with respect to flexible pipe coupling 10. Specifically, FIGS. 5 and 6 show a flexible pipe coupling 10a for communicating fluid that includes a first member 12a and a second member 14a. The first member 12a includes a first end 16a, a second end 18a, an inner surface 20a defining an aperture 22a extending between the first end 16a and the second end 18a, and an outer surface 24a defining national pipe taper, or NPT, threads 26a. FIGS. 7 and 8 show a flexible pipe coupling 10b for communicating fluid includes a first member 12b and a second member 14b. The first member 12b includes a first end 16b, a second end 18b, an inner surface 20b defining an aperture 22b extending between the first end 16b and the second end 18b, and an outer surface 24b defining national pipe taper, or NPT, threads 26b.

The outer surface 24 can also define an external surface 30 operable to cooperate with a tool for turning the first member 12 relative to the second member 14. The surface 30 can define a plurality of planar surfaces operable to be engaged by a wrench or similar tool. FIG. 7 shows surface 30b defining a plurality of knurls for cooperating with a tool.

Referring now to FIGS. 3 and 4, the second member 14 includes an internal swag member 28 and is swivably engageable with respect to the first member 12. In other words, the first member 12 and second member 14 can rotate relative to one another. The first member 12 and second member 14 can be engaged relative to one another by inserting at least a portion 32 of the second member 14 with respect to the aperture 22 of the first member 12. The at least a portion 32 of the second member 14 can be freely insertable in the aperture 22 of the first member 12. The portion 32 can extend from the first end 16 to the second 18 when the first member 12 and second member 14 are engaged. Alternatively, as shown in FIGS. 5 and 6, the portion 32a can extend from end 18a of the first member 12a less than a length of the aperture 22a. Alternatively, as shown in FIGS. 7 and 8, the portion 32b can extend a length greater than the length of the aperture 22b.

As shown in FIGS. 3 and 4, the first member 12 and the portion 32 can define a substantially cylindrical fluid pathway between the first end 16 and the second end 18. FIGS. 5–8 show that alternative embodiments 10a, 10b of the flexible pipe coupling can be structured similarly.

Referring now to FIG. 4, the flexible pipe coupling 10 can also include means 34 for limiting an axial movement of the first member 12 and second member 14 relative to one another in a first direction. Limiting means 34 can include an annular projection 36 defined by an outer surface 38 of the second member 14. During insertion of the portion 32 of the second member 14 with respect to the aperture 22 of the first member 12, the annular projection 36 can engage the second end 18 of the first member 12 to limit axial movement of the first member 12 and the second member 14 with respect to one another.

Referring now to FIG. 6, flexible pipe coupling 10a can include limiting means 34a for limiting axial movement of the first member 12a and the second member 14a with respect to one another. Limiting means 34a can include an end 40a of the portion 32a. The inner surface 20a of the first member 12a can define one or more shoulders 42a. Shoulder 42a can engage the end 40a and limit axial movement of the first member 12a and the second member 14a toward one another. An annular projection 36a extending from outer surface 38a of the second member 14a, can be freely insertable with respect to one portion 37a of the aperture 22a. The projection 36a can engage a shoulder 41a defined by the inner surface 20a when the end 40a engages the shoulder 42a. The engagement of the projection 36a with the shoulder 41a and the engagement of the end 40a with the shoulder 42a can be concurrent.

Referring now to FIG. 8, flexible pipe coupling 10b can include limiting means 34b for limiting axial movement of the first member 12b and the second member 14b with respect to one another. Limiting means 34a can include a groove 68 defined by an outer surface 38b of the second member 14b and a snap ring 70 positionable with respect to the groove 68. The end 18b of the first member 12b can engage the snap ring 70 to limit axial movement of the first member 12b and the second member 14b with respect to one another.

Referring now to FIGS. 3 and 4, the flexible pipe coupling 10 can also include means 44 for limiting axial movement of the first member 12 and the second member 14 with respect to one another. Means 44 can include a groove defined by one of the inner surface 20 of the first member 12, an outer surface 38 of the second member 14 wherein the other of the inner surface of the first member and an outer surface of the second member is radially spaced from a bottom surface of the groove. In FIG. 4, an annular groove 46 is defined by the outer surface 38 of the second member 14. The inner surface 20 of the first member 12 is radially spaced from a bottom surface of the groove 46. After the first member 12 has been engaged with the second member 14, a snap ring 50 can be positioned with respect to the groove 46 to limit axial movement of the first member 12 and the second member 14 with respect to one another.

Referring now to FIGS. 5 and 6, means 44a can include an annular groove 46a defined by the inner surface 20a of the first member 12a. The outer surface 38a of the second member 14a is radially spaced from a bottom surface of the groove 46a. After the first member 12a has been engaged with the second member 14a, a snap ring 50a can be positioned with respect to the groove 46a to limit axial movement of the first member 12a and the second member 14a with respect to one another.

Referring now to FIGS. 7 and 8, means 44b can include a projection 72 extending from the outer surface 83b of the second member 14b. As the portion 32b is inserted with respect to the aperture 22b, the projection 72 can be radially compressed and engage the first end 16b in with a snap fit when the portion 32b extends past the first end 16b. The projection 72 can engage the first end 16b of the first member 12b to limit axial movement of the first member 12b and the second member 14b with respect to one another.

Referring now to FIG. 4, the flexible pipe coupling 10 can also include at least one groove defined by one of the inner surface 20 of the first member 12 and the outer surface 38 of the second member 14 for sealing the first member 12 with respect to the second member. The flexible pipe coupling 10 includes first and second grooves 52, 54 defined by the inner surface 20 of the first member 12. The grooves 52, 54 can be disposed between first limiting means 34 and second limiting means 44. O-rings 56, 58 can be positioned in grooves 52, 54, respectively.

Referring now to FIG. 4, the second member 14 includes an internal swag member 28 and an exterior wall 60. Teeth 64 are defined by an outer surface of the swag member 28. A flexible pipe 66, shown in phantom, can be engaged with the swag member 28 by moving the pipe 66 and the flexible pipe coupling 10 toward one another. After the swag member 28 has been inserted with respect to the pipe 66, a swagging tool (not shown) can be inserted through the second member 14 to expand the swag member 28 and compress the pipe 66 between an inner surface of the exterior wall 60 and the teeth 64. FIGS. 5–8 show that alternative embodiments 10a, 10b of the flexible pipe coupling can be structured similarly for engaging flexible pipe.

Figure 9:
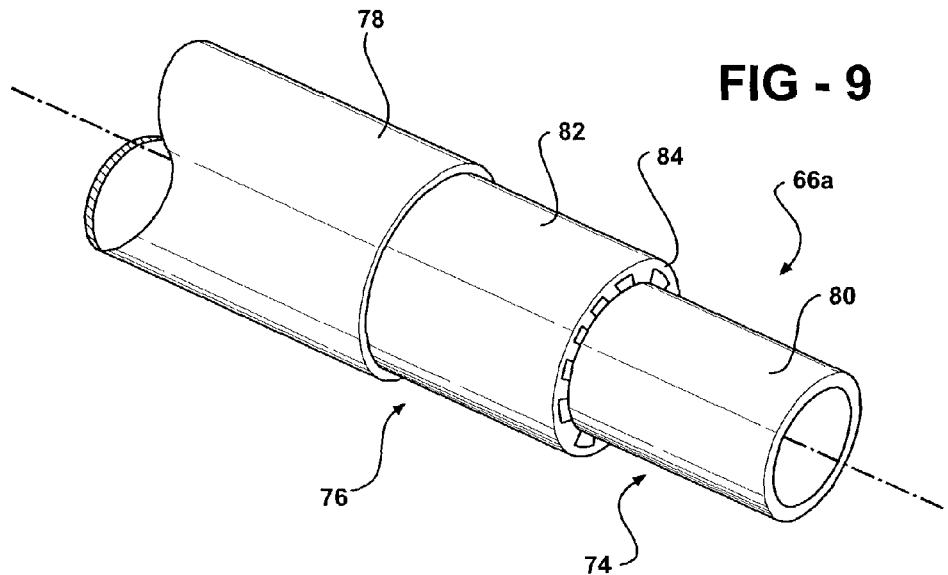
FIG. 9 is a perspective view of a flexible pipe engageable with the flexible pipe coupling of the present invention.

Referring now to FIG. 9, a flexible pipe 66a can include a primary hose 74, a secondary hose 76, and a protective layer 78. A fluid stream of fuel can flow through the primary hose 74 generally from a supply tank to a sump. Where the primary hose 74 is compromised by a leak, fuel can be contained in the secondary hose 76 and directed to the sump. The protective layer 78 can limit damage to the secondary hose that can occur during installation of the flexible pipe 66a. After the flexible pipe 66a has been disposed between the supply tank and the sump the desired length of the flexible pipe 66a can be selected. A length of the secondary hose 76 can be removed to expose a portion 80 of the primary hose 74, defining an end 84 of the secondary hose 76. At least some of the portion 80 is compressed between the swag member 28 and the exterior wall 60 during swagging. A length of protective layer 78 can be removed to expose a portion 82 of the secondary hose 76.

Figure 10:
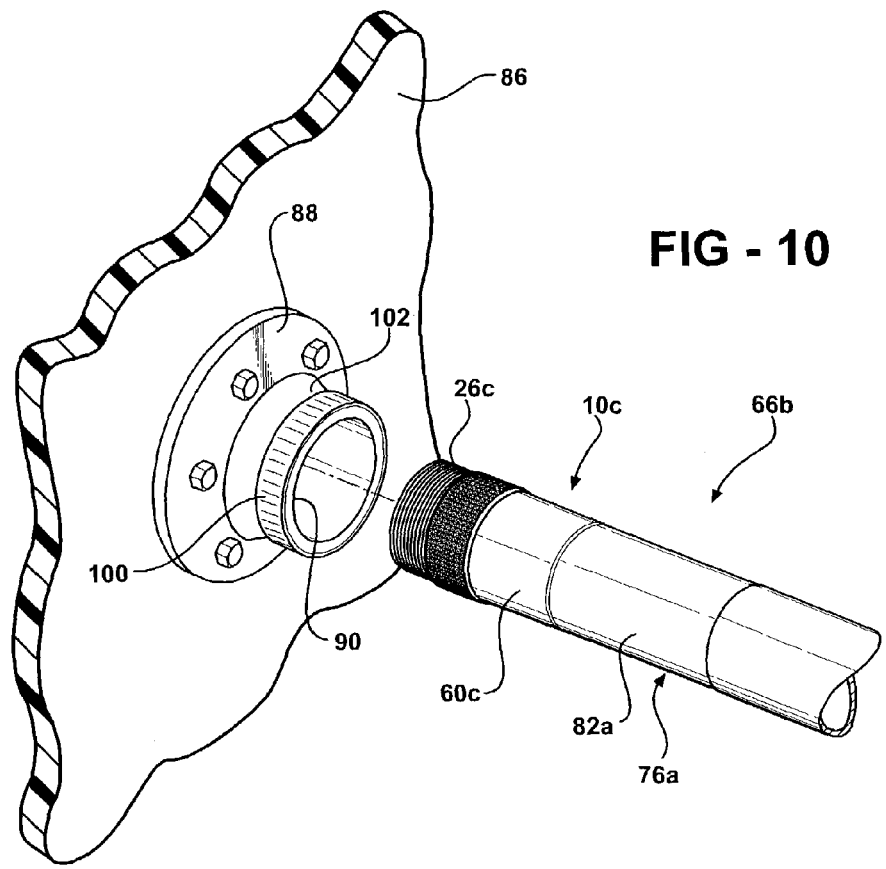
FIG. 10 is a perspective view of a flexible pipe engaged with a flexible pipe coupling before being inserted with respect to an entry boot of a sump.

In operation, swagging the flexible pipe coupling 10 with respect to the pipe 66 is performed after the flexible pipe has been cut to a desired length and before the flexible pipe 66 and flexible pipe coupling 10 are passed through a wall of a sump. Referring now to FIG. 10, a flexible pipe coupling 10c can be swagged with respect to a flexible pipe 66b and portion 82a of the secondary hose 76a can be exposed. An outer diameter of the wall 60c can be substantially the same as the outer diameter of the secondary hose 76a. A sump 86 is positioned underground beneath a fuel dispenser (not shown). The sump 86 includes an opening for receiving an entry boot 88. The entry boot 88 includes an aperture 90 for receiving the flexible pipe coupling 10c and the flexible pipe 66b. The aperture 90 extends the length of the entry boot 88 and is sized to sealingly engage the outer surface of the portion 82a of the secondary hose 76a. The aperture 90 can sealingly engage the secondary hose 76a at two positions, a first position external with respect to the sump 86 and a second position internal with respect to the sump 86. A clamp 100 can be disposed about a portion 102 of the boot 88 and the secondary hose 76a to enhance the sealing engagement of the boot 88 with respect to the secondary hose 76a.

The swivel fitting 10c defines NPT threads 26c. The aperture 90 can be sized so that the swivel fitting 10c can pass through the aperture 90 of the entry boot 88. The secondary hose 76a can be sized to sealingly engage the aperture 90 of the entry boot 88. The outer diameter of the secondary hose 76a can be substantially the same as the outer diameter of the surface of the swivel fitting 10c defining the NPT threads 26c. As a result, the present invention eliminates the need for an adaptor, such as a supplemental specialized fitting.

Figure 11:
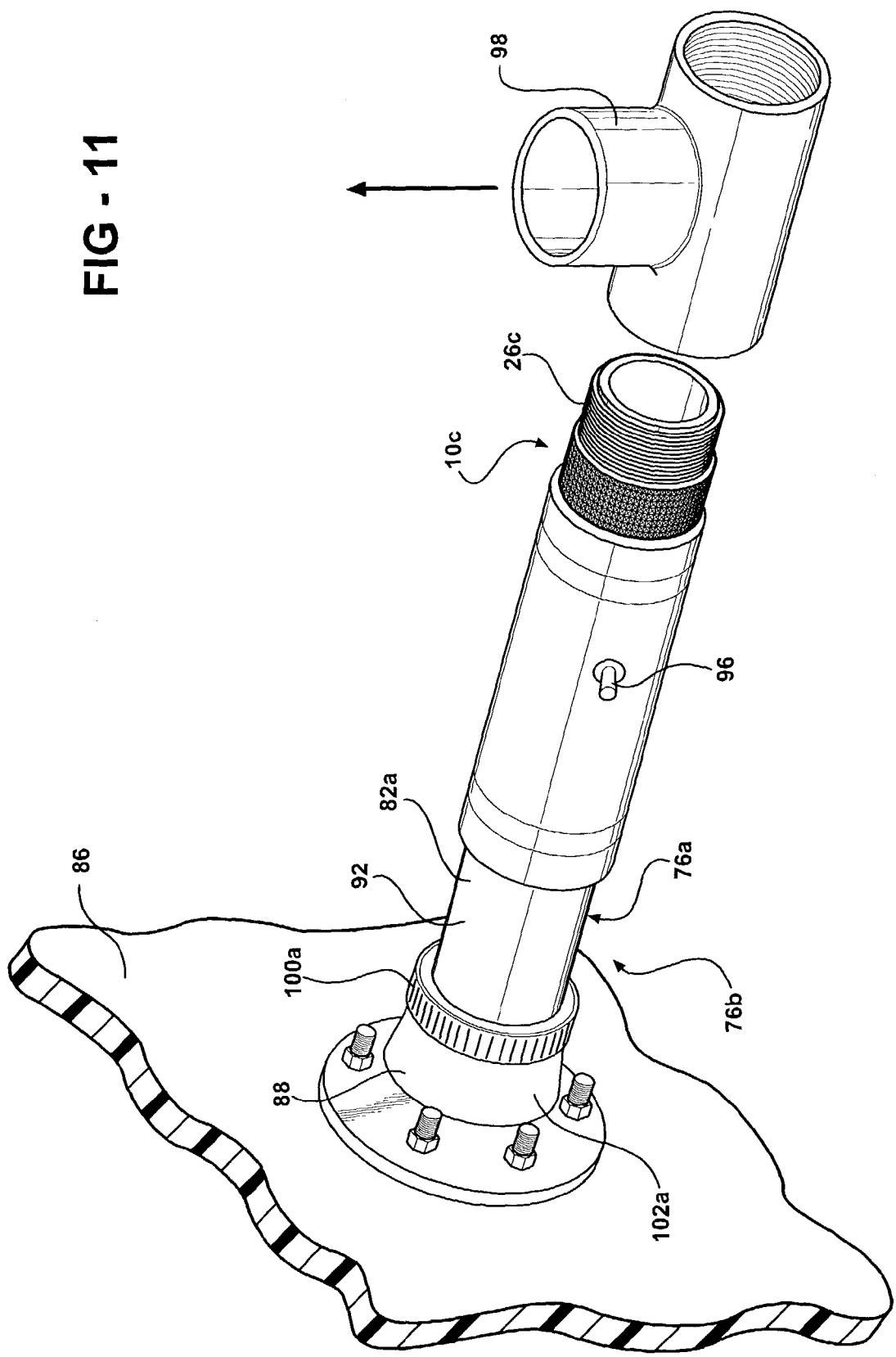
FIG. 11 is a perspective view of a flexible pipe engaged with a flexible pipe coupling after being inserted with respect to the entry boot of the sump.

Referring now to FIG. 11, flexible pipe coupling 10c can pass through entry boot 88 and be disposed internal with respect to the sump 86. After the flexible pipe coupling 10c has passed through the entry boot 88, a secondary test boot 94 can be inserted over the flexible pipe coupling 10c. The secondary test boot 94 can seal with respect to the secondary hose 76a and the exterior surface of the wall 60c (covered by the secondary test boot). The fitting 96 can receive air to increase the air pressure internal of the secondary hose 76b and test for leaks. The NPT threads 26c of the flexible pipe coupling 10c can engage a connector 98, such as T-connector or an elbow connector, in fluid communication with a fuel dispenser (not shown) located above-ground. A clamp 100a can be disposed about a portion 102a of the boot 88 and the secondary hose 76*a* to enhance the sealing engagement of the boot 88 with respect to the secondary hose 76*a*.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. In a system for communicating fluid between a storage tank and a dispensing device, the system including a sump with at least one opening and an entry boot associated with the at least one opening for receiving and sealing a flexible fluid transport conduit having an inner, primary, fluid-containment conduit and an outer, secondary, fluid-containment jacket sheathing the primary conduit, the improvement of an adapter comprising:
    a first generally cylindrical member having a first end, a second end, an inner surface defining an aperture extending between the first end and the second end, and an outer surface defining treads adjacent at least one end;
    a second generally cylindrical member including an internal swag portion to be inserted within an internal diameter of a longitudinal end of the primary fluid-containment conduit, the second member swivelably connected with respect to the first member;
    a third generally cylindrical member sheathing the internal swag portion of the second member with sufficient clearance to receive the primary conduit for swaging engagement with the fluid conduit adapter; and
    a locking ring engagable between the first and second members for holding the first and second members in a relatively fixed longitudinal position with respect to one another, while allowing rotation of the first and second members about a common axis with respect to one another, wherein the first, second, and third members of the adapter have maximum external dimensions sufficiently small to allow insertion of the adapter through the entry boot and the associated opening into the sump, while permitting sealing engagement between the entry boot and an external periphery of the outer, secondary, fluid-containment jacket, wherein at least a portion of the second member is freely insertable in the aperture of the first member and the at least a portion of the second member is insertable in the first end and extends to the second end.

2. The apparatus of claim 1 wherein the inner surface defines a shoulder between the first and second ends and the portion of the second member engages the shoulder when the portion of the second member is inserted in the aperture.

3. The apparatus of claim 1 wherein the first member and the portion of the second member define a substantially cylindrical fluid pathway between the first end and the second end.

4. The apparatus of claim 1 further comprising:
    the locking ring for limiting axial movement of the first member and the second member relative to one another in at least one direction.

5. The apparatus of claim 4 further comprising:
    an annular projection defined by an outer surface of the second member.

6. The apparatus of claim 5 wherein the annular projection is freely insertable in the aperture of the first member.

7. The apparatus of claim 4 further comprising the groove defined by one of the inner surface of the first member and an outer surface of the second member, wherein the other of the inner surface of the first member and the outer surface of the second member is radially spaced from a bottom surface of the groove.

8. The apparatus of claim 4, wherein locking ring further comprises:
    a snap ring.

9. The apparatus of claim 4 further comprising:
    the groove defined by one of the inner surface of the first member and an outer sure of the second member, the groove disposed between first member and second member; and
    the lock ring further comprising a snap ring positionable in the groove.

10. The apparatus of claim 1 further comprising:
    a flexible pipe including a primary fluid containment hose and a secondary fluid containment hose sheathing the primary hose to capture and retain fluid leaks from the primary hose, wherein the primary hose extends internally with respect to the secondary hose and is swagged to the second member.

11. The apparatus of claim 10 further comprising:
    a sump defining at least one opening; and
    an entry boot positionable with respect to the at least one opening and including an aperture, wherein the first and second members are moveable through the aperture and positionable in the sump, and the entry boot sealing engages the secondary hose.

12. The apparatus of claim 10 wherein an outside diameter of the secondary hose is substantially the same as an outside diameter of the outer surface defining the threads.

13. The apparatus of claim 1 wherein the portion of the second member is integral with at least a portion of the limiting means.

14. The apparatus of claim 13, wherein the portion of the limiting means limits axial movement of the first member and the second member relative to one another in an axial direction.

15. The apparatus of claim 13 wherein the portion of the limiting means limits axial movement of the first member and the second member toward one another.

16. The apparatus of claim 1 wherein the first member and the portion of the second member define a substantially cylindrical fluid pathway between the first end and the second end.

17. The apparatus of claim 1 further comprising:
    the groove defined by one of the inner surface of the first member and an outer surface of the second member, the groove disposed between first and second ends of the first member; and
    the locking ring further comprises a snap ring positionable in the groove.

18. The system of claim 1, wherein the locking ring engages within a groove positioned in at least one location selected from a group of locations including being formed in the first member adjacent a longitudinal end closest to the swag member, being formed in the second member adjacent a longitudinal end closest to the swag member, and being formed in the first and second members adjacent a longitudinal end opposite from the swag member.

19. The system of claim 1, wherein one of the locking ring and the first member engages with an outwardly extending flange from the second member.

* * * * *